United States Patent
Kawahara et al.

(10) Patent No.: US 6,613,833 B2
(45) Date of Patent: Sep. 2, 2003

(54) METHOD FOR PRODUCING AQUEOUS ETHYLENE-VINYL ALCOHOL COPOLYMER COMPOSITION

(75) Inventors: Takaharu Kawahara, Okayama (JP); Toshio Tuboi, Okayama (JP); Yukihiro Ohara, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 100 days.

(21) Appl. No.: 09/922,693

(22) Filed: Aug. 7, 2001

(65) Prior Publication Data

US 2002/0028871 A1 Mar. 7, 2002

(30) Foreign Application Priority Data

Aug. 7, 2000 (JP) ........................................ 2000-238365

(51) Int. Cl.[7] ................................................ C08L 31/04
(52) U.S. Cl. ........................ 524/557; 524/379; 524/394; 524/405; 524/417; 524/503; 524/524; 525/60; 264/141; 264/142
(58) Field of Search ................................. 524/379, 394, 524/405, 417, 503, 524, 557; 525/60; 264/141, 142

(56) References Cited

U.S. PATENT DOCUMENTS

| 3,816,379 A | 6/1974 | Rosenbaum et al. |
| 3,847,845 A | 11/1974 | Tada et al. |
| 4,611,029 A | 9/1986 | Takahashi |
| 5,288,925 A | 2/1994 | Poindexter |
| 5,302,417 A | 4/1994 | Yamauchi et al. |
| 5,744,547 A | 4/1998 | Moritani et al. |
| 5,866,655 A | 2/1999 | Fujiwara et al. |
| 6,184,288 B1 | 2/2001 | Ninomiya et al. |
| 6,288,165 B1 | 9/2001 | Moritani et al. |
| 2002/0100997 A1 * | 8/2002 | Kawahara et al. .......... 264/142 |
| 2002/0135098 A1 * | 9/2002 | Kawai et al. ................ 264/143 |
| 2002/0143098 A1 * | 10/2002 | Kawai et al. ................ 524/503 |

FOREIGN PATENT DOCUMENTS

| EP | 0 937 557 A1 | 8/1999 |
| FR | 1.241.689 | 8/1960 |
| FR | 1.360.102 | 3/1964 |
| GB | 1 620 946 | 5/1970 |
| WO | WO 96/34897 | 11/1996 |

OTHER PUBLICATIONS

Patent Abstracts of Japan, JP 58–122903, Jul. 21, 1983.

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

A method for producing an aqueous ethylene-vinyl alcohol copolymer (EVOH) composition that ensures efficient removal of alcohol not worsening the environment in and around working areas, and which provides EVOH pellets of the aqueous composition, which can be produced stably and can be washed rapidly, the method involving introducing an EVOH solution that contains at least 50 parts by weight, relative to 100 parts by weight of EVOH therein, of an alcohol having a boiling point of not higher than 100° C., into a vessel, and contacting it with water vapor in the vessel, thereby letting the alcohol out along with water vapor and taking the resulting aqueous EVOH composition that contains from 0 to 10 parts by weight of the alcohol and from 10 to 500 parts by weight of water, relative to 100 parts by weight of EVOH therein, out of the vessel; and the EVOH pellets obtained by cutting the aqueous EVOH composition obtained in the method.

44 Claims, 1 Drawing Sheet

METHOD FOR PRODUCING AQUEOUS ETHYLENE-VINYL ALCOHOL COPOLYMER COMPOSITION

BACKGROUND OF THE INVENTION

1. Field of the Invention

The present invention relates to a method for producing an aqueous ethylene-vinyl alcohol copolymer (EVOH) composition, and to pellets of EVOH obtained according to the production method.

2. Discussion of the Background

EVOH is a useful polymer material having good oxygen barrier properties, aroma retentiveness, oil resistance, antistatic properties and mechanical strength, and is widely used for films, sheets, containers, etc. One general method of producing EVOH comprises saponifying an ethylene-vinyl ester copolymer that is obtained through polymerization of ethylene with a vinyl ester of a fatty acid such as vinyl acetate or the like, in an alcohol-containing organic solvent in the presence of a saponification catalyst.

For post-treating the alcohol solution of EVOH obtained through saponification, for example, Japanese Patent Publication No. 38634/1972 (U.S. Pat. No. 3,847,845) discloses a method of producing EVOH pellets which comprises adding water to an optionally-concentrated methanol solution of EVOH to such a degree that no EVOH deposit is formed therein to prepare a methanol-water mixed solution of EVOH that contains from 15 to 45% by weight of EVOH, then extruding it into strands in water or in a methanol-water mixed solution having a lower methanol concentration that the EVOH solution, at 50° C. or lower, and thereafter cutting the strands. It is stated therein that the methanol concentration in the methanol-water mixed solution in the coagulating bath preferably is between 10 and 50% by weight. It is further stated therein that the pellets thus obtained are porous and can be readily washed with water to remove the saponification catalyst residue and that the pellets are easy to handle in the subsequent washing and drying step.

Regarding the process of adding water to a methanol solution of the EVOH after saponification, for example, demonstrated in Example 1 of Japanese Patent Laid-Open No. 90927/1999 (EP 937,557) is a method of producing a completely transparent, uniform methanol/water solution of EVOH, which comprises adding an aqueous methanol solution having a water content of 62.5% by weight to a methanol solution of EVOH having an EVOH content of 30% by weight, under an azeotropic condition at 100° C. to 110° C. under a pressure of 3 kg/cm²G so as to remove methanol until the EVOH content of the resulting EVOH solution increases up to 40% by weight.

However, in the method of producing EVOH pellets by coagulating an EVOH solution that contains a large amount of methanol, the alcohol often vaporizes in the step of coagulation. The alcohol vapor worsens the working environment and injures the health of the workers, and, in addition, it has negative influences on the area around the working site. Therefore, improving the method is desired.

In cases where EVOH having an ethylene content of smaller than 20 mol % and/or a degree of saponification of smaller than 95% is processed according to the method as above, EVOH strands are difficult to form in the coagulating bath since the coagulation rate of EVOH in the bath is low. As a result, the EVOH strands, even though formed, are often miscut and are often contaminated with fine powder. Stable production of EVOH pellets in the method is difficult. Even EVOH having an ethylene content of 20 mol % or more and/or a degree of saponification of 95% or more is poorly coagulated or is difficult to handle, when it is coagulated in strands at an increased coagulation rate through an increased number of nozzles so as to increase the production efficiency, and, as a result, its strands are often miscut and stable production of its pellets is not easy.

In addition, the EVOH pellets obtained in the conventional methods contain alcohol and the catalyst residue in saponification, alkali metal salts, and therefore require washing to remove them. To increase the washing speed, elevating the temperature of the washing liquid will be effective. However, if the temperature is elevated too high, the pellets will fuse as they contain alcohol. Therefore, it is a problem that the washing speed cannot be sufficiently increased.

SUMMARY OF THE INVENTION

Accordingly, one object of the present invention is to provide a method for producing an aqueous EVOH composition that ensures efficient removal of alcohol without worsening the environment in and around working areas. Another object is to provide EVOH pellets of the aqueous composition which can be produced stably and can be washed rapidly.

We, the present inventors have assiduously studied, and have found that the problems noted above can be solved by providing a method for producing an aqueous ethylene-vinyl alcohol copolymer composition that comprises contacting an alcohol-containing ethylene-vinyl alcohol copolymer solution with water vapor to thereby remove the alcohol along with water vapor.

Specifically, one aspect of the invention is a method for producing an aqueous ethylene-vinyl alcohol copolymer composition, which comprises introducing an ethylene-vinyl alcohol copolymer solution that contains at least 50 parts by weight, relative to 100 parts by weight of the ethylene-vinyl alcohol copolymer therein, of an alcohol having a boiling point of not higher than 100° C., into a vessel, and contacting the solution with water vapor in the vessel, thereby letting the alcohol out along with water vapor and taking the resulting aqueous ethylene-vinyl alcohol copolymer composition that contains from 0 to 10 parts by weight of the alcohol and from 10 to 500 parts by weight of water, relative to 100 parts by weight of the ethylene-vinyl alcohol copolymer therein, out of the vessel.

In the production method, preferably, the ethylene-vinyl alcohol copolymer solution is continuously introduced into the vessel. Also preferably, the ethylene-vinyl alcohol copolymer solution is contacted with water vapor in a column vessel, or is contacted therewith in countercurrent flow.

In one preferred embodiment of the method, the ethylene-vinyl alcohol copolymer solution is introduced into the vessel through its upper part with water vapor through its lower part, and the aqueous ethylene-vinyl alcohol copolymer composition is taken out of the vessel through its lower part with the alcohol being let out through its upper part along with water vapor.

Also preferably, the amount of water vapor to be introduced into the vessel is between 0.3 and 30 times in terms of the ratio by weight to the amount of the ethylene-vinyl alcohol copolymer solution introduced thereinto. Also preferably, the temperature in the vessel in which the ethylene-vinyl alcohol copolymer solution is contacted with water vapor is between 100° C. and 150° C. and the pressure therein is between 1 and 6 kg/cm².

Also preferably, the alcohol to be used in the production method is methanol. Also preferably, the ethylene content of the ethylene-vinyl alcohol copolymer is between 3 and 70 mol % and the degree of saponification thereof is at least 80 mol %.

Another aspect of the invention is ethylene-vinyl alcohol copolymer pellets which are produced by cutting the aqueous ethylene-vinyl alcohol copolymer composition obtained in the production method. For these, preferably, a melt of the aqueous ethylene-vinyl alcohol copolymer composition is extruded into strands in a coagulating bath and the thus-coagulated strands are cut. Also preferably, a melt of the aqueous ethylene-vinyl alcohol copolymer composition is directly cut.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
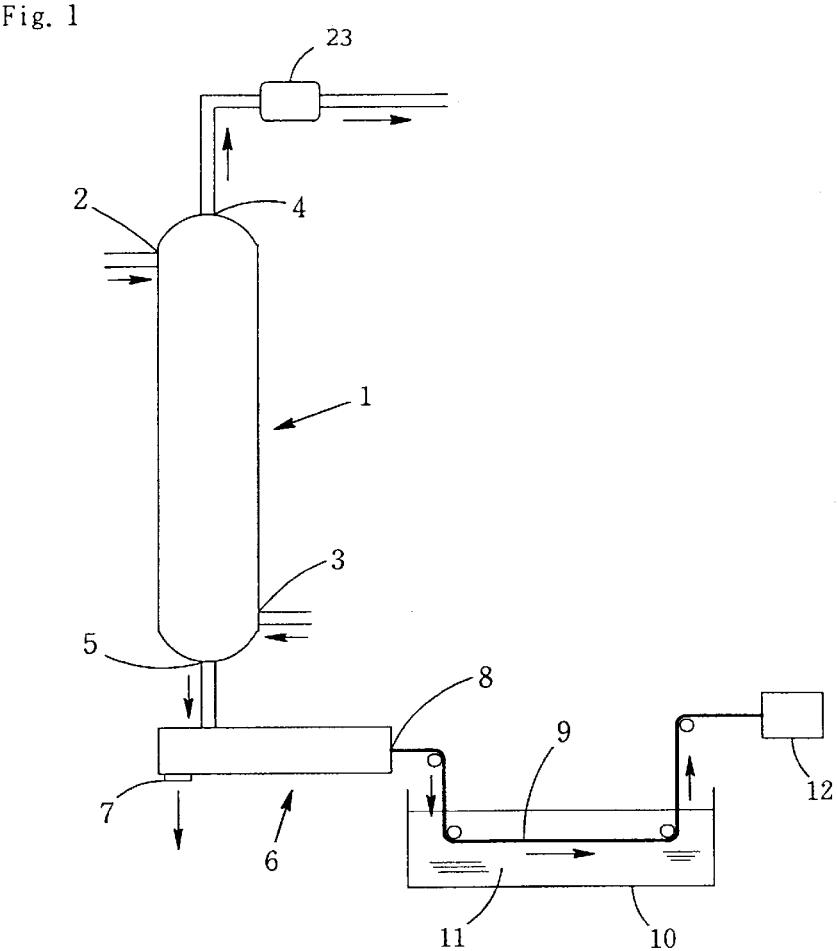
FIG. 1 is a schematic view showing the apparatus used in Example 1 for producing EVOH pellets.

In general, EVOH for use in the invention is obtained by saponifying an ethylene-vinyl ester copolymer. Its ethylene content generally is between 3 and 70 mol %. For ensuring good melt moldability of the resin composition to give moldings with good gas barrier properties, the ethylene content of EVOH preferably is between 10 and 60 mol %, more preferably between 20 and 55 mol %, most preferably between 25 and 55 mol %. The degree of saponification of the vinyl ester moiety to give the vinyl alcohol moiety in EVOH is generally at least 80 mol %, but preferably at least 95 mol %, more preferably at least 99 mol % to ensure moldings with good gas barrier properties.

EVOH having an ethylene content of from 3 to 20 mol % is preferred, as soluble in water, and an aqueous solution of EVOH of the type is an excellent coating material with good stability capable of being formed into coating films with good barrier properties.

EVOH having a degree of saponification of from 80 to 95 mol % may be used for improving the moldability and workability of resin compositions. Though it may be used alone, but is preferably blended with EVOH having a degree of saponification of higher than 99 mol %.

In regard to the production process, however, EVOH having an ethylene content of from 3 to 20 mol % and EVOH having a degree of saponification of from 80 to 95 mol % are both problematic in that the methanol solution of EVOH of either type is difficult to extrude and coagulate into strands in a coagulating bath. The invention has made it possible to readily coagulate EVOH of these types to stably produce their pellets. In this respect, the meaning of the invention is significant.

In general, the melt moldability of EVOH having an ethylene content of smaller than 3 mol % is not good, and the waterproofness, the hot water resistance and the gas barrier properties at high humidity of EVOH of the type are often poor. On the other hand, the barrier properties and the printability of EVOH having an ethylene content of larger than 70 mol % are often poor. The barrier properties, the yellowing resistance and the moisture resistance of EVOH having a degree of saponification of smaller than 80 mol % are often unsatisfactory.

The method of producing EVOH for use in the invention is now described. To produce it, for example, ethylene is polymerized with a vinyl ester in any desired manner including not only solution polymerization but also suspension polymerization, emulsion polymerization and bulk polymerization and in any desired mode of continuous or batchwise polymerization. One example of batchwise solution polymerization to produce the polymer is described, for which the polymerization condition is as follows.

Solvent:

Alcohols having a boiling point of not higher than 100° C. are used. In view of the solubility of ethylene-vinyl ester copolymers and EVOH therein and of the handleability thereof, such alcohols are used. The boiling point of the alcohols to be used must not be higher than 100° C., and the reason is because the alcohol of which the boiling point is lower than that of water is efficiently substituted with water in the process of substituting it with water. Preferably, the boiling point of the alcohols for use herein is not higher than 80° C., more preferably not higher than 70° C.

Alcohols having a boiling point of not higher than 100° C. include, for example, methyl alcohol, ethyl alcohol, n-propyl alcohol, isopropyl alcohol and t-butyl alcohol. Methyl alcohol is especially preferred for use herein.

Catalyst:

Usable are azonitrile-type initiators such as 2,2-azobisisobutyronitrile, 2,2-azobis(2,4-dimethylvaleronitrile), 2,2-azobis-(4-methoxy-2,4-dimethylvaleronitrile) and 2,2-azobis(2-cyclopropylpropionitrile); and organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Vinyl Ester:

Usable are vinyl acetate and vinyl esters of fatty acids (e. g., vinyl propionate, vinyl pivalate). Preferred is vinyl acetate. EVOH for use herein may contain a comonomer component of a vinylsilane compound in an amount of from 0.0002 to 0.2 mol %. The vinylsilane compound includes, for example, vinyltrimethoxysilane, vinyltriethoxysilane, vinyltri((β-methoxyethoxy)silane and γ-methacryloxypropylmethoxysilane. Of those, preferred are vinyltrimethoxysilane and vinyltriethoxysilane.

The polymerization condition is as follows.

(1) Temperature: 20° C. to 90° C., preferably 40° C. to 70° C.

(2) Time: (2 to 15 hours, preferably 3 to 11 hours.

(3) Degree of polymerization: 10% to 90%, preferably 30% to 80% relative to the vinyl ester used.

(4) Resin content of the polymer solution: 5% to 85%, preferably 20% to 70%.

(5) Ethylene content of the copolymer: 3 to 70 mol %, preferably 10 to 60 mol %, more preferably 20 to 55 mol %, most preferably 25 to 55 mol %.

Except for ethylene and vinyl esters, any other minor comonomers capable of copolymerizing with them may be present in the polymerization system. The comonomers include, for example, α-olefins such as propylene, isobutylene, α-octene and α-dodecene; unsaturated acids such as acrylic acid, methacrylic acid, crotonic acid, maleic acid and itaconic acid, and their anhydrides, salts, or mono- or di-alkyl esters; nitrites such as acrylonitrile and methacrylonitrile; amides such as acrylamide and methacrylamide; olefinsulfonic acids such as ethylenesulfonic acid, allylsulfonic acid and methallylsulfonic acid, and their salts; alkyl vinyl ethers, vinyl ketones, N-vinylpyrrolidone, vinyl chloride and vinylidene chloride.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl ester is purged away. To purge the non-reacted vinyl ester from the ethylene-vinyl ester copolymer solution from which ethylene has been evaporated away, for example, the copolymer solution is continuously run into a column filled with raschig rings, through the upper part of the column at a constant flow rate, while a vapor of an organic solvent, preferably an alcohol having a boiling point of not higher than 100° C., most preferably methanol is jetted into the column through its lower part, whereby a mixed vapor of the organic solvent and the non-reacted vinyl ester is run off from the column through its top, and the copolymer solution from which the non-reacted vinyl ester was removed is taken out of the column through its bottom.

An alkali catalyst is added to the copolymer solution from which the vinyl ester was removed, and the vinyl ester moiety of the copolymer is saponified. For this, any of continuous or batchwise saponification is employable. The alkali catalyst includes, for example, sodium hydroxide, potassium hydroxide, and alkali metal alcoholates. One example of batchwise saponification is described, for which the condition is as follows.

(1) Concentration of copolymer solution: 10% to 50%.
(2) Reaction temperature: 30° C. to 65° C.
(3) Amount of catalyst: 0.02 to 1.0 equivalent (based on the vinyl ester moiety).
(4) Time: 1 to 6 hours.

The EVOH solution obtained through the reaction generally contains at least 50 parts by weight, relative to 100 parts by weight of EVOH therein, of the alcohol having a boiling point of not higher than 100° C. The alcohol content of the solution is preferably at least 70 parts by weight, more preferably at least 80 parts by weight. Also preferably, the alcohol content is at most 1000 parts by weight, more preferably at most 500 parts by weight. Having the alcohol content falling within the range, the EVOH solution is well fluid and the EVOH resin is produced efficiently. The alcohol is preferably methanol. The saponified EVOH solution is not limited to the alcohol solution as above. If desired, it may contain any other solvent such as water, and may be in the form of a solution in such a mixed solvent. For adding water thereto, for example, referred to are the prior art methods mentioned above.

The present invention is a method for producing an aqueous ethylene-vinyl alcohol copolymer composition, which comprises introducing an ethylene-vinyl alcohol copolymer solution that contains at least 50 parts by weight, relative to 100 parts by weight of the ethylene-vinyl alcohol copolymer therein, of an alcohol having a boiling point of not higher than 100° C., such as that produced in the manner as above, into a vessel, and contacting it with water vapor in the vessel, thereby letting the alcohol out along with water vapor and taking the resulting aqueous ethylene-vinyl alcohol copolymer composition that contains from 0 to 10 parts by weight of the alcohol and from 10 to 500 parts by weight of water, relative to 100 parts by weight of the ethylene-vinyl alcohol copolymer therein, out of the vessel.

As so described hereinabove, the EVOH solution prepared through saponification generally contains much alcohol. In the invention, the EVOH solution of the type is introduced into a vessel and is contacted with water vapor therein, whereby the alcohol is let out along with water vapor and the resulting aqueous EVOH composition having a reduced alcohol content is taken out of the vessel.

The mode of contacting the EVOH solution with water vapor in a vessel is not specifically limited, and may be any of continuous or batchwise modes. The shape of the vessel to be employed for it is not also specifically limited. For continuous systems, however, preferred is a column vessel; and for batchwise systems, preferred is a tank vessel. From the viewpoint of production efficiency, preferred are continuous systems for industrial production. Examples of the column vessel are plate columns such as porous plate columns or bubble-cap towers, and packed columns such as those filled with a ring-type filler.

The EVOH solution and water vapor introduced into a vessel are preferably contacted with each other in countercurrent flow therein, from the viewpoint of the efficiency of alcohol removal. For example, one preferred embodiment of the method comprises introducing an EVOH solution into a column vessel through its upper part and water vapor through its lower part so that the two are contacted with each other in countercurrent flow in the vessel, and taking the resulting aqueous EVOH composition out of the vessel through its lower part with the released alcohol being let out through the upper part of the vessel along with water vapor. The alcohol vapor and water vapor having been thus let out through the upper part of the column vessel are condensed in a condenser and the resulting aqueous alcohol solution is taken out. If desired, it may be purified and recycled.

Regarding the amount of water vapor to be introduced into the vessel, if it is too small, the alcohol removal efficiency will be low; but if too large, it will increase the production costs. Accordingly, the amount of water vapor to be introduced preferably is between 0.3 and 30 times in terms of the ratio by weight to the amount of the EVOH solution introduced into the vessel, more preferably between 0.5 and 10 times, even more preferably between 0.7 and 5 times. The water vapor to be contacted with the EVOH solution may contain at most 10 parts by weight of an alcohol, relative to 100 parts by weight of the water vapor. However, for more efficient alcohol removal, it is desirable that the water vapor does not contain an alcohol.

Preferably, the temperature in the vessel is between 100 and 150° C. If the temperature in the vessel is lower than 100° C., the aqueous EVOH composition produced therein could not be well fluid, and will gel in the vessel or will clog the vessel. More preferably, the temperature is not lower than 110°C., even more preferably not lower than 120° C. On the other hand, if the temperature in the vessel is higher than 150° C., the EVOH resin will deteriorate therein. More preferably, the temperature is not higher than 140° C.

Regarding the pressure in the vessel, if it is too low, the alcohol removal efficiency will be low; but if too high, the temperature of the EVOH solution in the vessel will rise and EVOH will be thermally deteriorated. Accordingly, the pressure preferably is between 1 and 6 $kg/cm^2$, more preferably between 1.5 and 5 $kg/cm^2$, even more preferably between 2 and 4 $kg/cm^2$.

In the invention, the EVOH solution is kept in direct contact with water vapor in the vessel, and its alcohol content gradually decreases. In this stage, EVOH is in the form of a swollen paste, not gelled, and can be smoothly taken out of the vessel as it is still fluid.

EVOH dissolves in a water/methanol mixed solvent under atmospheric pressure, for example, at 60° C. to 70° C. or so, but could not dissolve in a solvent of water alone under atmospheric pressure. However, we, the present inventors have found that, even when EVOH contains substantially water alone, it is still fluid in the presence of pressurized water vapor at a temperature not lower than 100° C. As a result, we have made it possible to continuously treat EVOH with ease, for example, in a column vessel.

The aqueous EVOH composition to be taken out of the vessel contains from 0 to 10 parts by weight of an alcohol and from 10 to 500 parts by weight of water, relative to 100 parts by weight of EVOH therein, and it is still fluid.

The alcohol content of the aqueous EVOH composition is between 0 and 10 parts by weight, but preferably between 0 and 5 parts by weight, more preferably between 0 and 1 part by weight, even more preferably 0 and 0.1 part by weight. As the alcohol content of the aqueous EVOH composition is lowered, alcohol vaporization is prevented in the post-treatment step of coagulating the composition, and the environment in and around the working areas can be kept good. In addition, even when the pellets of the EVOH composition are washed with water at an elevated temperature for removing the saponification catalyst residue, they do not stick together. Therefore, the temperature of the washing water can be elevated, and, as a result, the washing speed can be increased.

The water content of the aqueous EVOH composition is between 10 and 500 parts by weight. If the water content is smaller than 10 parts by weight, the fluidity of the composition in the vessel will be poor. Preferably, the water content is at least 30 parts by weight, more preferably at least 50 parts by weight. However, if the water content is larger than 500 parts by weight, it is problematic in that the EVOH composition could not be stably coagulated into strands. If so, in addition, the pellets produced by cutting the composition in melt often fuse together and their shape is not homogeneous. Preferably, the water content is at most 300 parts by weight, more preferably at most 200 parts by weight.

The aqueous EVOH composition obtained in the manner as herein generally contains from 0.1 to 5 parts by weight, relative to 100 parts by weight of EVOH therein and in terms of the metal, of an alkali metal salt, and also salts as by-products and other impurities.

Taken out of the vessel, the aqueous EVOH composition is cut into pellets. The method of cutting is not specifically limited. For example, a melt of the aqueous EVOH composition is extruded into strands in a coagulating bath, and the thus-coagulated strands are cut; or the aqueous EVOH composition is directly cut in melt.

In the method of extruding it into strands in a coagulating bath followed by cutting them, the aqueous EVOH composition taken out of the vessel is first extruded in a coagulating bath through nozzles to be strands having a desired diameter. In this step, if the water content of the aqueous EVOH composition is too high, water will separate from the composition and the thus-separated water will be jetted out of nozzles to interfere with continuous formation of EVOH strands. Therefore, it is desirable to previously remove water from the aqueous EVOH composition by treating it in a kneader or the like, and thereafter the composition is extruded out through nozzles into strands in a coagulating bath to coagulate them. The kneader may be composed of a cylinder equipped with a liquid-discharging port, and a screw fitted therein.

The coagulating bath is water, but may contain a small amount of an alcohol. In the conventional method in which a methanol solution or water/methanol mixed solution of EVOH is extruded in a coagulating bath, methanol must be added to the coagulating bath so as to lower the specific gravity of the bath for preventing the extruded strands from floating in the bath before they are coagulated therein. In the present invention, however, the coagulating bath to be used may be water alone not containing an alcohol, since the coagulation rate of the strands extruded therein is high. The method of the invention is therefore superior to the conventional method, not worsening the environment in and around the working areas.

Preferably, the temperature of the coagulating bath is between 0° C. and 50° C., and that of the molten aqueous EVOH composition to be extruded in the bath is between 100° C. and 150° C. The temperature difference enables the coagulation of the aqueous EVOH composition extruded in the bath. More preferably, the temperature of the coagulating bath is between 0° C. and 30° C., and that of the molten aqueous EVOH composition to be extruded in the bath is between 110° C. and 140° C.

The coagulated strands are cut with a cutter into pellets. The cutter is preferably a strand cutter.

Figure 2:
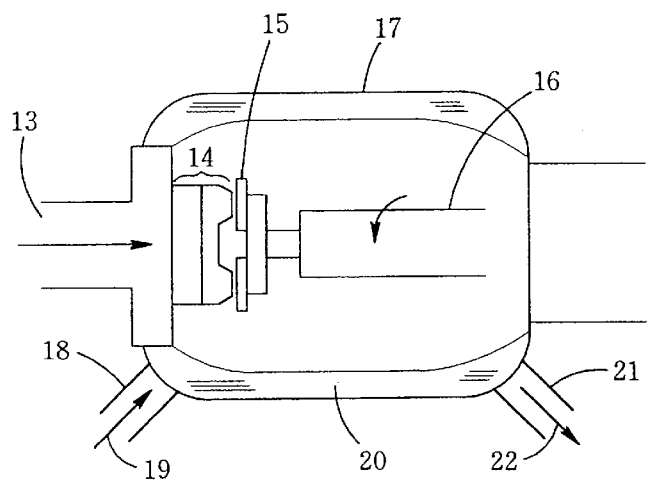
FIG. 2 is a schematic view showing one example of the constitution of a hot cutter used in the invention.

In case where the aqueous EVOH composition taken out of the vessel is directly cut in melt, a hot cutting system or an in-water cutting system is preferred for the method. The nozzles through which the composition is extruded preferably have an orifice diameter of from 2 to 5 mmΦ (Φ indicates a diameter, and the same shall apply hereinunder), as the pellets thus formed are easy to handle. FIG. 2 shows one example of a hot cutter usable in a hot cutting system. In this, 13 indicates an aqueous EVOH composition inlet port; 14 indicates a die; 15 indicates a rotary blade; 16 indicates a rotation axis; 17 indicates a cutter box; 18 indicates a cooling water inlet port; 19 indicates cooling water; 20 indicates a water membrane; 21 indicates a pellets take-out port; and 22 indicates cooling water and pellets.

If the water content of the aqueous EVOH composition to be cut is too high, water will separate from the composition and the thus-separated water will be jetted out of nozzles to interfere with stable cutting of the composition. Therefore, like in the case of cutting EVOH strands as above, it is also desirable to previously remove water from the aqueous EVOH composition by treating it in a kneader or the like, and thereafter the composition is jetted out through nozzles and cut into pellets.

The EVOH pellets thus obtained generally contain the residue of the catalyst used in saponification, alkali metal salts. If the catalyst residue content of the pellets is too high, it causes a quality problem of yellowing. Therefore, it is desirable to remove the catalyst residue by washing the pellets. The washing method is not specifically limited. For example, the pellets are washed by dipping them in water or an aqueous acid solution of acetic acid or the like.

The washing temperature may fall between 0 and 95° C. From the viewpoint of higher washing efficiency, the washing temperature is preferably higher. However, if too high, it is unfavorable as causing fusion of pellets. The lowermost limit of the washing temperature is preferably at least 20° C., more preferably at least 30° C., most preferably at least 40° C. In the prior art method, the washing temperature generally is between 25° C. and 30° C. or so. Compared with this, the washing temperature in the method of the invention may be high, which is another characteristic feature of the invention. The uppermost limit of the washing temperature is preferably at most 80° C., more preferably at most 70° C. After thus washed, the alkali metal salt content of the EVOH pellets is preferably at most 0.05 parts by weight in terms of the metal, more preferably at most 0.03 parts by weight.

Preferably, at least one selected from the group consisting of carboxylic acids, boron compounds, phosphate compounds, alkali metal salts and alkaline earth metal salts is added to the EVOH pellets for improving the quality such as the thermal stability of the pellets. The method of adding it to the pellets is not specifically limited, and any known method is employable. For example, the pellets are dipped in an aqueous solution containing at least one selected from the group consisting of carboxylic acids, boron compounds, phosphate compounds, alkali metal salts and alkaline earth metal salts so that they adsorb it.

Examples of carboxylic acids usable herein are oxalic acid, succinic acid, benzoic acid, citric acid, acetic acid, lactic acid and propionic acid. Preferably used is acetic acid, lactic acid or propionic acid, as inexpensive and easily available. Regarding the carboxylic acid content of the dry EVOH pellets of the invention, if it is too small, the pellets will be yellowed while molded in melt; but if too large, interlayer adhesion of the EVOH moldings will be poor. Therefore, the carboxylic acid content of the dry EVOH pellets of the invention preferably is between 10 and 5000 ppm. The lowermost limit of the carboxylic acid content is preferably at least 30 ppm, more preferably at least 50 ppm. The uppermost limit of the carboxylic acid content is preferably at most 1000 ppm, more preferably at most 500 ppm.

Examples of phosphate compounds usable herein are various acids such as phosphoric acid and phosphorous acid and their salts. Any phosphate of any type of primary phosphates, secondary phosphates and tertiary phosphates may be added to the EVOH pellets, and its cation is not specifically limited. Preferred are alkali metal salts and alkaline earth metal salts. Above all, sodium dihydrogenphosphate, potassium dihydrogenphosphate, disodium hydrogenphosphate and dipotassium hydrogenphosphate are preferred for the phosphate compound to be added to the EVOH pellets. The phosphate compound content of the dry EVOH pellets of the invention preferably is between 1 and 1000 ppm in terms of the phosphate radical. Containing a phosphate compound within the preferred range, the EVOH moldings are prevented from being yellowed and from having gels and fish eyes. If the phosphate compound content is smaller than 1 ppm, the EVOH pellets will be much yellowed when molded in melt; and if higher than 1000 ppm, the EVOH moldings will have gels and fish eyes.

Examples of boron compounds usable herein are boric acids, borates, salts of boric acids, and boron hydrides, which, however, are not limitative. Boric acids include orthoboric acid, metaboric acid and tetraboric acid; borates include triethyl borate and trimethyl borate; and salts of boric acids include alkali metal salts and alkaline metal salts of various boric acids mentioned above, and borax. Of those compounds, preferred is orthoboric acid (this is simply referred to as boric acid). Regarding the boron compound content of the dry EVOH pellets of the invention, if it is too small, the thermal stability of the pellets is not so good; but if too large, the pellets will often gel and their moldability is often poor. Therefore, the boron compound content preferably is between 10 and 2000 ppm in terms of boron, more preferably between 50 and 1000 ppm.

An alkali metal salt, if added to the EVOH pellets of the invention, effectively improves the interlayer adhesion and the compatibility of the EVOH moldings with other resins. The amount of the alkali metal salt to be in the dry EVOH pellets preferably is between 5 and 5000 ppm in terms of the alkali metal element, more preferably between 20 and 1000 ppm, even more preferably between 30 and 750 ppm. The alkali metal includes lithium, sodium and potassium; and the alkali metal salt includes salts of aliphatic carboxylic acids, salts of aromatic carboxylic acids, salts of phosphoric acids, and metal complexes. Examples are sodium acetate, potassium acetate, sodium propionate, sodium phosphate, lithium phosphate, sodium stearate, potassium stearate, and sodium ethylenediamine-tetraacetate. Of those, preferred are sodium acetate, potassium acetate, sodium propionate and sodium phosphate.

Adding an alkaline earth metal salt to the EVOH pellets is also preferred. Containing an alkaline earth metal salt, the yellowing resistance of the EVOH pellets may be lowered in some degree, but when the EVOH pellets are molded in melt, the amount of the thermally-deteriorated EVOH that may adhere to the die of the molding machine can be reduced. The alkaline earth metal salt is not specifically limited, including, for example, magnesium salts, calcium salts, barium salts and beryllium salts. Especially preferred are magnesium salts and calcium salts. The anion of the alkaline earth metal salt is not also specifically limited, but preferred are aliphatic carboxylate anions and phosphate anions. Above all, especially preferred are magnesium acetate, calcium acetate, magnesium propionate, calcium propionate, magnesium phosphate and calcium phosphate. The alkaline earth metal content of the dry EVOH pellets of the invention preferably is between 10 and 1000 ppm in terms of the metal, more preferably between 20 and 500 ppm. If the alkaline earth metal salt content is smaller than 10 ppm, the long-run workability of the EVOH pellets will be inferior; but if larger than 1000 ppm, the EVOH pellets will be much yellowed when molded in melt.

The EVOH pellets are generally dried. After they are dried, the water content of the dry EVOH pellets is generally at most 1% by weight, but preferably at most 0.5% by weight. Compared with conventional EVOH pellets that are produced by coagulating an alcohol-containing EVOH solution into strands in a coagulating bath followed by cutting the resulting strands into pellets, the EVOH pellets of the invention that are produced by extruding the aqueous EVOH composition of the invention into strands followed by cutting them into pellets can be dried rapidly, and this is still another characteristic feature of the invention. Accordingly, the time for drying the EVOH pellets of the invention can be shortened, and it saves the production costs of the pellets.

The drying method is not specifically limited, for which, for example, preferred is static drying or flow drying. If desired, a multi-stage drying method comprising a combination of some different drying modes is employable herein. For example, the EVOH pellets are first dried in a flow drying mode, and then in a static drying mode.

The aqueous EVOH composition of the invention can be well dried in any one-step drying method, though conventional EVOH compositions require a combination of some different drying methods for efficiently drying them. Accordingly, not only the drying time can be shortened in the invention but also the latitude in the drying process in the invention is broadened. This is still another advantage of the invention.

EXAMPLES

The invention is described more concretely with reference to the following Examples, which, however, are not intended to restrict the scope of the invention. FIG. 1 is a schematic view showing the apparatus used in Example 1 for producing EVOH pellets. In this, the starting material, EVOH solution is introduced into a plate column 1 at its uppermost tier 2, and water vapor is introduced thereinto at the lowermost tier 3. The EVOH solution moves downward in the column 1 while the water vapor moves upward therein, and therefore the two are contacted with each other in counter-current flow. A mixed vapor of water and methanol are led out through the top 4, and it is condensed in a condenser 23 and the resulting aqueous methanol solution is recovered. The aqueous EVOH composition is taken out through the bottom 5, and led into a kneader 6. Through the discharge port 7 of the kneader 6, water that contains a small amount of methanol is discharged out; and aqueous EVOH strands 9 are extruded through the die 8. The aqueous EVOH strands 9 are led into the coagulation liquid 11 filled in a coagulation bath 10, in which they are coagulated, and then the thus-coagulated strands are cut with a strand cutter 12 into pellets.

Example 1

An EVOH solution containing 100 parts by weight of EVOH having an ethylene content of 32 mol % and a degree of saponification of 99.5 mol %, 100 parts by weight of methanol, 50 parts by weight of water and 2 parts by weight, in terms of sodium, of sodium acetate was continuously introduced into a 10-tier plate column having a column diameter of 0.3 m, at its uppermost tier at a flow rate of 52 kg/hr, while water vapor was jetted thereinto at the lowermost tier of the column at a flow rate of 86 kg/hr, so that the EVOH solution was contacted with water vapor in counter-current flow in the column. The temperature in the column was 130° C., and the pressure therein was 3 kg/cm$^2$. The methanol vapor and water vapor led out of the column through its top was condensed in a condenser, and the resulting aqueous methanol solution was recovered. The aqueous EVOH composition thus produced was taken out of the column through its bottom. This contained 0.05 part by weight of methanol, 105 parts by weight of water and 2 parts by weight, in terms of sodium, of sodium acetate, relative to 100 parts by weight of EVOH therein.

Next, the aqueous EVOH composition was led into a kneader equipped with a discharge port and having a diameter of 50 mm and a length of 660 mm (L/D=13.2), at a flow rate of 41 kg/hr. The screw revolution in the kneader was 100 rpm. The aqueous EVOH composition thus led out through the discharge port contained 0.03 part by weight of methanol, 63 parts by weight of water and 1.2 parts by weight, in terms of sodium, of sodium acetate relative to 100 parts by weight of EVOH therein, and its temperature was 118° C. Next, this was extruded into a coagulating bath of water at 10° C. through four nozzles (each having a diameter of 6 mm), and coagulated to be strands. The strands were led out of the coagulating bath, and cut with a strand cutter into pellets.

The thus-obtained pellets were washed with water at 50° C. to thereby lower the sodium acetate content thereof to 0.002% by weight in terms of sodium. While washed with water, the pellets did not fuse together. After thus washed, the pellets were dipped in an aqueous solution containing 0.09% of acetic acid and 0.022% of sodium dihydrogenphosphate for 2 hours, and then dewatered. Next, these were dried at 100° C. to thereby lower the water content thereof to 0.2% by weight, for which the drying time taken was 3 hours. The dried pellets contained 510 ppm of acetic acid, 52 ppm of sodium element, and 107 ppm of phosphate radical. These were usable for various moldings.

In this process, methanol did not vaporize in air, and the working environment was good.

Example 2

The same process as in Example 1 for producing an aqueous EVOH composition was repeated, except that water vapor was jetted into the plate column at its lowermost tier at a flow rate of 42 kg/hr, that the temperature in the column was 124° C. and that the pressure therein was 2.5 kg/cm$^2$. Herein obtained was an aqueous EVOH composition containing 0.8 part by weight of methanol and 102 parts by weight of water relative to 100 parts by weight of EVOH therein, through the bottom of the column.

In this process, methanol did not vaporize in air, and the working environment was good.

Example 3

The same process as in Example 1 for producing an aqueous EVOH composition was repeated, except that an EVOH solution containing 100 parts by weight of EVOH having an ethylene content of 55 mol % and a degree of saponification of 90.5 mol % and 185 parts by weight of methanol was used as the starting material. Herein obtained was an aqueous EVOH composition containing 0.08 part by weight of methanol and 87 parts by weight of water relative to 100 parts by weight of EVOH therein, through the bottom of the column.

In this process, methanol did not vaporize in air, and the working environment was good.

Example 4

300 kg of an EVOH solution containing 100 parts by weight of EVOH having an ethylene content of 32 mol % and a degree of saponification of 99.5 mol %, 140 parts by weight of methanol and 90 parts by weight of water was fed into a 500-liter tank vessel, and water vapor was continuously jetted into the vessel through its lower part at a flow rate of 75 kg/hr. The temperature in the vessel was 138° C., and the pressure therein was 4 kg/cm$^2$. The methanol vapor and water vapor were led out of the vessel through its upper part and condensed in a condenser, and the resulting aqueous methanol solution was recovered. After 10 hours for which water vapor was kept jetted into the vessel, jetting it thereinto was stopped, and the resulting aqueous EVOH composition was taken out of the vessel through its bottom. This contained 7 parts by weight of methanol and 125 parts by weight of water relative to 100 parts by weight of EVOH therein.

In this process, methanol did not vaporize in air, and the working environment was good.

Example 5

The same process as in Example 1 was repeated, except that an EVOH solution containing 100 parts by weight of EVOH having an ethylene content of 17 mol % and a degree of saponification of 99.1 mol %, 85 parts by weight of methanol, 85 parts by weight of water and 3 parts by weight, in terms of sodium, of sodium acetate was used. Dried at 100° C. for 6 hours, the EVOH pellets had a lowered water content of 0.2% by weight. The dried pellets contained 550 ppm of acetic acid, 61 ppm of sodium element, and 114 ppm of phosphate radical. These were usable for various moldings.

Example 6

The same process as in Example 1 was repeated except that ethanol was used in place of methanol. Herein obtained was an aqueous EVOH composition containing 0.4 part by weight of ethanol, 107 parts by weight of water and 2 parts by weight, in terms of sodium, of sodium acetate relative to 100 parts by weight of EVOH therein, through the bottom of the plate column. Next, also in the same manner as in Example 1, the composition was passed through a kneader, then coagulated into strands, cut into pellets, washed with water, dipped in an aqueous solution of acetic acid and sodium dihydrogenphosphate, and dewatered. Dried at 100° C. for 3 hours, the EVOH pellets had a lowered water content of 0.2% by weight. The dried pellets contained 480 ppm of acetic acid, 47 ppm of sodium element, and 95 ppm of phosphate radical. These were usable for various moldings.

Example 7

An EVOH solution containing 100 parts by weight of EVOH having an ethylene content of 32 mol % and a degree of saponification of 90.5 mol %, 100 parts by weight of methanol, 50 parts by weight of water and 2 parts by weight, in terms of sodium, of sodium acetate was continuously introduced into a 10-tier plate column having a column diameter of 0.3 m, at its uppermost tier at a flow rate of 52 kg/hr, while water vapor was jetted thereinto at the lowermost tier of the column at a flow rate of 86 kg/hr, so that the EVOH solution was contacted with water vapor in countercurrent flow in the column. The temperature in the column was 130° C., and the pressure therein was 3 kg/cm$^2$. The methanol vapor and water vapor led out of the column through its top was condensed in a condenser, and the resulting aqueous methanol solution was recovered. The aqueous EVOH composition thus produced was taken out of the column through its bottom. This contained 0.05 part by weight of methanol, 105 parts by weight of water and 2 parts by weight, in terms of sodium, of sodium acetate, relative to 100 parts by weight of EVOH therein.

Next, the aqueous EVOH composition was led into a kneader equipped with a discharge port and having a diameter of 50 mm and a length of 660 mm (L/D=13.2), at a flow rate of 41 kg/hr. The screw revolution in the kneader was 100 rpm. The aqueous EVOH composition thus led out through the discharge port contained 0.03 part by weight of methanol, 63 parts by weight of water and 1.2 parts by weight, in terms of sodium, of sodium acetate relative to 100 parts by weight of EVOH therein, and its temperature was 118° C. Next, this was extruded out through a die with 6 orifices each having a diameter of 3 mm, and cut with a hot cutter with four blades, at a distance of 0.05 mm from the die. The revolution of the cutter blades was 1200 rpm.

The thus-obtained pellets were washed with water at 50° C. to thereby lower the sodium acetate content thereof to 0.002% by weight in terms of sodium. While washed with water, the pellets did not fuse together. After thus washed, the pellets were dipped in an aqueous solution containing 0.09% of acetic acid and 0.022% of sodium dihydrogenphosphate at 50° C. for 4 hours, and then dewatered. Next, these were dried in a drying oven to thereby lower the water content thereof to 0.2% by weight. The dried pellets contained 400 ppm of acetic acid, 35 ppm of sodium element and 88 ppm of phosphate radical. These were usable for various moldings.

Example 8

The same process as in Example 7 was repeated, except that an EVOH solution containing 100 parts by weight of EVOH having an ethylene content of 17 mol % and a degree of saponification of 99.1 mol %, 85 parts by weight of methanol, 85 parts by weight of water and 3 parts by weight, in terms of sodium, of sodium acetate was introduced into the plate column. While washed with water at 50° C., the pellets obtained herein did not fuse together. The dried pellets contained 450 ppm of acetic acid, 40 ppm of sodium element and 94 ppm of phosphate radical. These were usable for various moldings.

Example 9

The same process as in Example 7 was repeated except that ethanol was used in place of methanol. Herein obtained was an aqueous EVOH composition containing 0.4 part by weight of ethanol, 107 parts by weight of water and 2 parts by weight, in terms of sodium, of sodium acetate relative to 100 parts by weight of EVOH therein, through the bottom of the plate column. Next, also in the same manner as in Example 7, the composition was passed through a kneader, then cut into pellets with a hot cutter, washed with water, dipped in an aqueous solution of acetic acid and sodium dihydrogenphosphate, and dewatered. While washed with water at 50° C., the pellets did not fuse together. After dried, the pellets contained 410 ppm of acetic acid, 44 ppm of sodium element and 90 ppm of phosphate radical. These were usable for various moldings.

Comparative Example 1

A solution of EVOH of the same type as in Example 1, having an ethylene content of 32 mol % and a degree of saponification of 99.5 mol %, which contained 100 parts by weight of methanol, 50 parts by weight of water and 2 parts by weight, in terms of sodium, of sodium acetate relative to 100 parts by weight of EVOH therein, was extruded into a coagulating bath comprised of 10% by weight of methanol and 90% by weight of water at 10° C. through four nozzles (each having a diameter of 6 mm), and coagulated to be strands. The strands were led out of the coagulating bath, and cut with a strand cutter into pellets. The thus-obtained pellets were washed with water at 50° C. to thereby lower the sodium acetate content thereof to 0.002% by weight in terms of sodium. While washed with water, the pellets significantly fused together. After thus washed, the pellets were dipped in an aqueous solution containing 0.09% of acetic acid and 0.022% of sodium dihydrogenphosphate for 2 hours, and then dewatered. Next, these were dried at 100° C. in the same manner as in Example 1, but it took 35 hours to lower the water content thereof to 0.2% by weight. The dried pellets contained 510 ppm of acetic acid, 53 ppm of sodium element, and 104 ppm of phosphate radical.

Comparative Example 2

A solution of EVOH as in Example 5, having an ethylene content of 17 mol % and a degree of saponification of 99.1 mol %, which contained 85 parts by weight of methanol, 85 parts by weight of water and 3 parts by weight, in terms of sodium, of sodium acetate relative to 100 parts by weight of EVOH therein, was extruded into a coagulating bath comprised of 5% by weight of methanol and 95% by weight of water at 10° C. through four nozzles (each having a diameter of 6 mm). However, as the EVOH solution was poorly coagulated, its strands soon cut, and it was impossible to further continue the process.

Comparative Example 3

An EVOH solution containing 100 parts by weight of EVOH having an ethylene content of 32 mol % and a degree of saponification of 90.5 mol %, 100 parts by weight of methanol, 50 parts by weight of water and 2 parts by weight, in terms of sodium, of sodium acetate was extruded into a coagulating bath comprised of 10% by weight of methanol and 90% by weight of water at 10° C. through six nozzles (each having a diameter of 3 mm), and coagulated to be strands. However, the strands cut very often, and it was impossible to stably form them. The strands were led out of the coagulating bath, and cut with a strand cutter into pellets. The thus-obtained pellets were washed with water at 50° C., but they significantly fused together. In this process, pellets usable for various moldings could not be obtained.

As described in detail hereinabove with reference to its preferred embodiments, the invention provides a method for producing an aqueous EVOH composition that ensures efficient removal of alcohol not worsening the environment in and around working areas. It also provides EVOH pellets of the aqueous composition, which can be produced stably and can be washed rapidly.

While the invention has been described in detail and with reference to specific embodiments thereof, it will be apparent to one skilled in the art that various changes and modifications can be made therein without departing from the spirit and scope thereof.

Japanese application 2000-238365, filed Aug. 7, 2000, the benefit of whose foreign priority is claimed herein, is hereby incorporated by reference.

What is claimed is:

1. A method for producing an aqueous ethylene-vinyl alcohol copolymer composition, which comprises
    introducing an ethylene-vinyl alcohol copolymer solution that contains at least 50 parts by weight, relative to 100 parts by weight of the ethylene-vinyl alcohol copolymer therein, of an alcohol having a boiling point of not higher than 100° C., into a vessel,
    introducing water vapor into the vessel, wherein the water vapor introduced into the vessel contains 0 parts to at most 10 parts by weight of an alcohol, relative to 100 parts by weight of the water vapor,
    contacting the solution with the water vapor in the vessel
    separately removing (1) alcohol and water vapor, and (2) an aqueous ethylene-vinyl alcohol copolymer composition that contains from 0 to 10 parts by weight of the alcohol and from 10 to 500 parts by weight of water, relative to 100 parts by weight of the ethylene-vinyl alcohol copolymer therein, from the vessel,
    and optionally
    extruding the aqueous ethylene-vinyl alcohol copolymer composition and cutting the extruded composition into pellets.

2. The method for producing an aqueous ethylene-vinyl alcohol copolymer composition as claimed in claim 1, wherein the ethylene-vinyl alcohol copolymer solution is continuously introduced into the vessel.

3. The method for producing an aqueous ethylene-vinyl alcohol copolymer composition as claimed in claim 1, wherein the ethylene-vinyl alcohol copolymer solution is contacted with water vapor in a column vessel.

4. The method for producing an aqueous ethylene-vinyl alcohol copolymer composition as claimed in claim 1, wherein the ethylene-vinyl alcohol copolymer solution is contacted with water vapor in countercurrent flow.

5. The method for producing an aqueous ethylene-vinyl alcohol copolymer composition as claimed in claim 4, wherein the ethylene-vinyl alcohol copolymer solution is introduced into an upper part of the vessel, the water vapor is introduced into a lower part of the vessel, the aqueous ethylene-vinyl alcohol copolymer composition is removed from a lower part of the vessel, and the alcohol and water vapor are removed from an upper part of the vessel.

6. The method for producing an aqueous ethylene-vinyl alcohol copolymer composition as claimed in claim 1, wherein the weight ratio of the amount of water vapor introduced into the vessel to the amount of the ethylene-vinyl alcohol copolymer solution introduced thereinto is at least 0.3 and not more than 30.

7. The method for producing an aqueous ethylene-vinyl alcohol copolymer composition as claimed in claim 6, wherein the weight ratio of the amount of water vapor introduced into the vessel to the amount of the ethylene-vinyl alcohol copolymer solution introduced thereinto is at least 0.5 and not more than 10.

8. The method for producing an aqueous ethylene-vinyl alcohol copolymer composition as claimed in claim 7, wherein the weight ratio of the amount of water vapor introduced into the vessel to the amount of the ethylene-vinyl alcohol copolymer solution introduced thereinto is at least 0.7 and not more than 5.

9. The method for producing an aqueous ethylene-vinyl alcohol copolymer composition as claimed in claim 1, wherein the water vapor introduced into the vessel contains no alcohol.

10. The method for producing an aqueous ethylene-vinyl alcohol copolymer composition as claimed in claim 1, wherein the temperature in the vessel in which the ethylene-vinyl alcohol copolymer solution is contacted with water vapor is at least 100° C. and not more than 150° C., and the pressure therein is at least 1 and not more than 6 kg/cm$^2$.

11. The method for producing an aqueous ethylene-vinyl alcohol copolymer composition as claimed in claim 10, wherein the temperature in the vessel in which the ethylene-vinyl alcohol copolymer solution is contacted with water vapor is at least 110° C.

12. The method for producing an aqueous ethylene-vinyl alcohol copolymer composition as claimed in claim 11, wherein the temperature in the vessel in which the ethylene-vinyl alcohol copolymer solution is contacted with water vapor is at least 120° C.

13. The method for producing an aqueous ethylene-vinyl alcohol copolymer composition as claimed in claim 10, wherein the temperature in the vessel in which the ethylene-vinyl alcohol copolymer solution is contacted with water vapor is not more than 140° C.

14. The method for producing an aqueous ethylene-vinyl alcohol copolymer composition as claimed in claim 10, wherein the pressure therein is at least 1.5 and not more than 5 kg/cm$^2$.

15. The method for producing an aqueous ethylene-vinyl alcohol copolymer composition as claimed in claim 14, wherein the pressure therein is at least 2 and not more than 4 kg/cm$^2$.

16. The method for producing an aqueous ethylene-vinyl alcohol copolymer composition as claimed in claim 1, wherein the alcohol is methanol.

17. The method for producing an aqueous ethylene-vinyl alcohol copolymer composition as claimed in claim 1, wherein the ethylene content of the ethylene-vinyl alcohol copolymer is at least 3 and not more than 70 mol % and the degree of saponification thereof is at least 80 mol %.

18. The method for producing an aqueous ethylene-vinyl alcohol copolymer composition as claimed in claim 17, wherein the ethylene content of the ethylene-vinyl alcohol copolymer is at least 10 and not more than 60 mol %.

19. The method for producing an aqueous ethylene-vinyl alcohol copolymer composition as claimed in claim 18, wherein the ethylene content of the ethylene-vinyl alcohol copolymer is at least 20 and not more than 55 mol % and the degree of saponification thereof is at least 80 mol %.

20. The method for producing an aqueous ethylene-vinyl alcohol copolymer composition as claimed in claim 19, wherein the ethylene content of the ethylene-vinyl alcohol copolymer is at least 25 and not more than 55 mol %.

21. The method for producing an aqueous ethylene-vinyl alcohol copolymer composition as claimed in claim 17, wherein the degree of saponification thereof is at least 95 mol %.

22. The method for producing an aqueous ethylene-vinyl alcohol copolymer composition as claimed in claim 21, wherein the degree of saponification thereof is at least 99 mol %.

23. The method for producing an aqueous ethylene-vinyl alcohol copolymer composition as claimed in claim 1, wherein the ethylene-vinyl alcohol copolymer contains a monomer component of a vinylsilane compound in an amount of 0.0002 to 0.2 mol %.

24. The method for producing an aqueous ethylene-vinyl alcohol copolymer composition as claimed in claim 1, wherein after removal from the vessel, a melt of the aqueous ethylene-vinyl alcohol copolymer composition is extruded into strands in a coagulating bath to form coagulated strands, and the coagulated strands are cut into pellets.

25. The method for producing an aqueous ethylene-vinyl alcohol copolymer composition as claimed in claim 24, wherein water is removed from the aqueous ethylene-vinyl alcohol copolymer composition prior to extruding.

26. The method for producing an aqueous ethylene-vinyl alcohol copolymer composition as claimed in claim 24, wherein the coagulating bath contains water and substantially no alcohol.

27. The method for producing an aqueous ethylene-vinyl alcohol copolymer composition as claimed in claim 26, wherein the coagulating bath temperature is at least 0° C. and not more than 50° C. and the melt of the aqueous ethylene-vinyl alcohol copolymer composition to be extruded temperature is at least 100° C. and not more than 150° C.

28. The method for producing an aqueous ethylene-vinyl alcohol copolymer composition as claimed in claim 27, wherein the coagulating bath temperature is at least 0° C. and not more than 30° C. and the melt of the aqueous ethylene-vinyl alcohol copolymer composition to be extruded temperature is at least 110° C. and not more than 140° C.

29. The method for producing an aqueous ethylene-vinyl alcohol copolymer composition as claimed in claim 1, wherein after removal from the vessel, a melt of the aqueous ethylene-vinyl alcohol copolymer composition is extruded and then cut into pellets.

30. The method for producing an aqueous ethylene-vinyl alcohol copolymer composition as claimed in claim 29, wherein the melt is cut using a hot cutting system or an in-water cutting system.

31. The method for producing an aqueous ethylene-vinyl alcohol copolymer composition as claimed in claim 29, wherein water is removed from the aqueous ethylene-vinyl alcohol copolymer composition prior to extruding.

32. The method for producing an aqueous ethylene-vinyl alcohol copolymer composition as claimed in claim 24, the pellets are washed.

33. The method for producing an aqueous ethylene-vinyl alcohol copolymer composition as claimed in claim 29, the pellets are washed.

34. The method for producing an aqueous ethylene-vinyl alcohol copolymer composition as claimed in claim 32, wherein the pellets are washed at a temperature of at least 0° C. and not more than 95° C.

35. The method for producing an aqueous ethylene-vinyl alcohol copolymer composition as claimed in claim 33, wherein the pellets are washed at a temperature of at least 0° C. and not more than 95° C.

36. The method for producing an aqueous ethylene-vinyl alcohol copolymer composition as claimed in claim 1, wherein extruding the aqueous ethylene-vinyl alcohol copolymer composition and cutting the extruded composition into pellets is carried out, and wherein at least one selected from the group consisting of carboxylic acids, boron compounds, phosphate compounds, alkali metal salts, and alkaline earth metal salts, is added to the pellets.

37. The method for producing an aqueous ethylene-vinyl alcohol copolymer composition as claimed in claim 36, wherein at least a carboxylic acid is added to the pellets.

38. The method for producing an aqueous ethylene-vinyl alcohol copolymer composition as claimed in claim 36, wherein at least a boron compound is added to the pellets.

39. The method for producing an aqueous ethylene-vinyl alcohol copolymer composition as claimed in claim 36, wherein at least a phosphorus compound is added to the pellets.

40. The method for producing an aqueous ethylene-vinyl alcohol copolymer composition as claimed in claim 36, wherein at least an alkali metal salt is added to the pellets.

41. The method for producing an aqueous ethylene-vinyl alcohol copolymer composition as claimed in claim 36, wherein at least an alkaline earth metal salt is added to the pellets.

42. Ethylene-vinyl alcohol copolymer pellets which are produced by cutting the aqueous ethylene-vinyl alcohol copolymer composition obtained in the method of claim 1.

43. Ethylene-vinyl alcohol copolymer pellets which are produced by the method as claimed in claim 24.

44. Ethylene-vinyl alcohol copolymer pellets which are produced by the method as claimed in claim 29.

* * * * *